June 18, 1963  J. H. JUDGE ETAL  3,094,040
PLASTIC WATER METER

Filed Nov. 29, 1957  3 Sheets-Sheet 1

INVENTORS
James H. Judge
BY Matthew H. Hetzel
Archie C. Weingart

Ralph Hammar
Attorney

June 18, 1963 J. H. JUDGE ETAL 3,094,040
PLASTIC WATER METER
Filed Nov. 29, 1957 3 Sheets-Sheet 2

INVENTORS
James H. Judge
BY Matthew H. Hegel
Archie E. Weingard
Ralph Hammer
Attorney June 18, 1963 J. H. JUDGE ETAL 3,094,040
PLASTIC WATER METER
Filed Nov. 29, 1957 3 Sheets-Sheet 3

INVENTORS
James H Judge
BY Matthew H Hetzel
Archie E Weingard
Ralph Hammar
attorney

United States Patent Office 3,094,040
Patented June 18, 1963

3,094,040
PLASTIC WATER METER
James H. Judge, Mathew H. Hetzel, and Archie E. Weingard, all of Abington Township, Montgomery County, Pa., assignors to American Meter Company, Incorporated, Philadelphia, Pa., a corporation of Delaware
Filed Nov. 29, 1957, Ser. No. 699,731
6 Claims. (Cl. 91—78)

This invention is a positive displacement nutating piston water meter measuring chamber in which the piston and the upper and lower parts of the measuring chamber each comprises a single injection molded plastic part. The piston is injection molded through a central sprue which serves as the piston stem thereby minimizing distortion of the disc and of the spherical ball at the center of the disc. The metal partition or diaphragm which separates the inlet and outlet apertures is molded as an insert in one of the parts (usually the lower part) of the measuring chamber and interlocks with the other part of the measuring chamber as the parts are assembled. The diaphragm projects outside the assembled chamber and both locates and liquid seals the chamber in the body of the meter.

Figure 1:
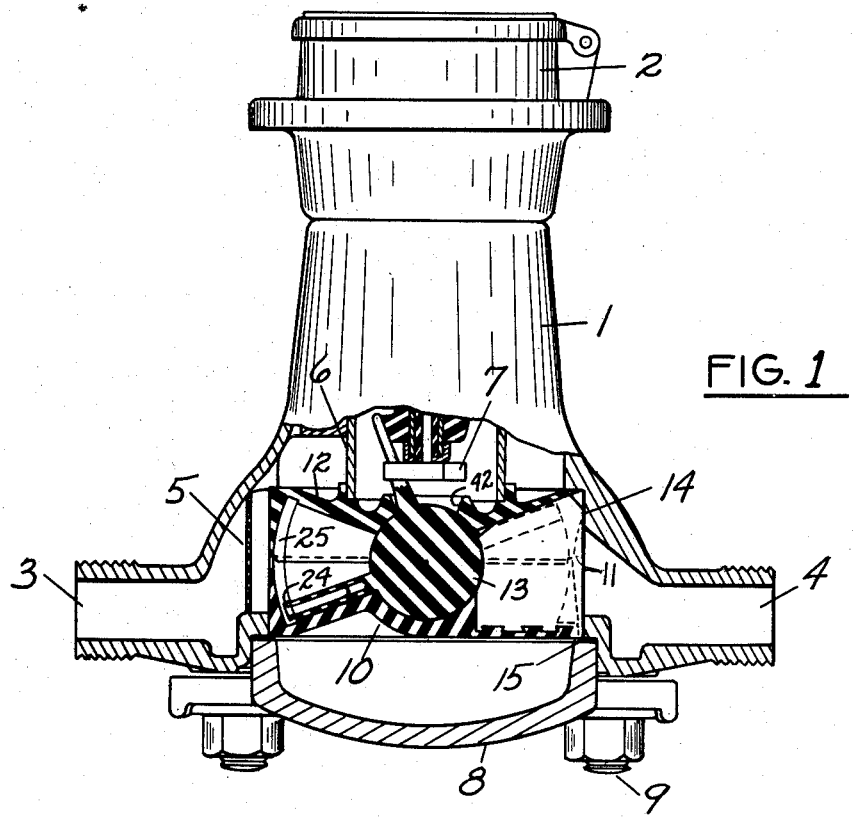
Figure 6:
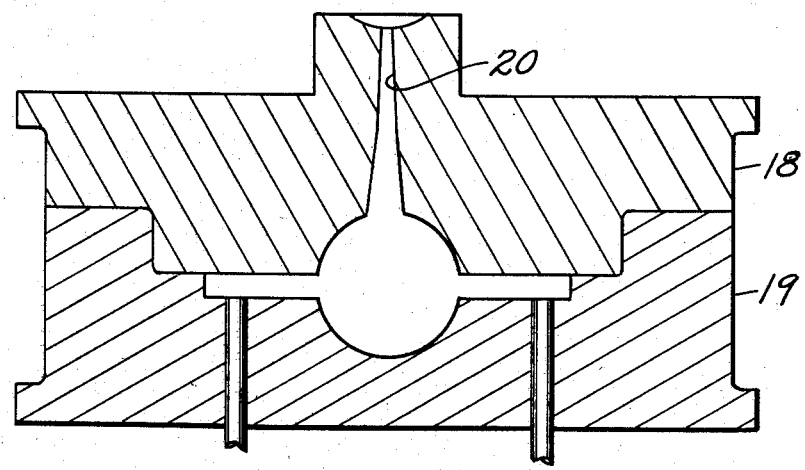
Figures 2, 2A:
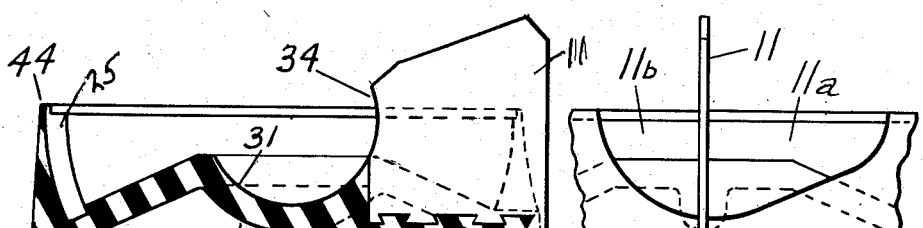
Figure 3:
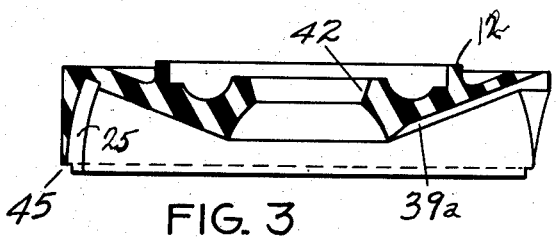
Figure 4:
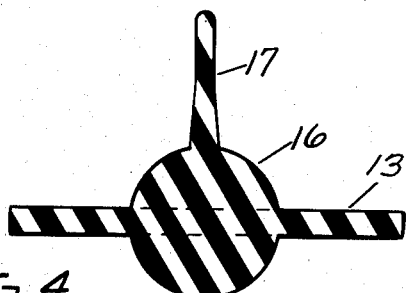
Figure 5:
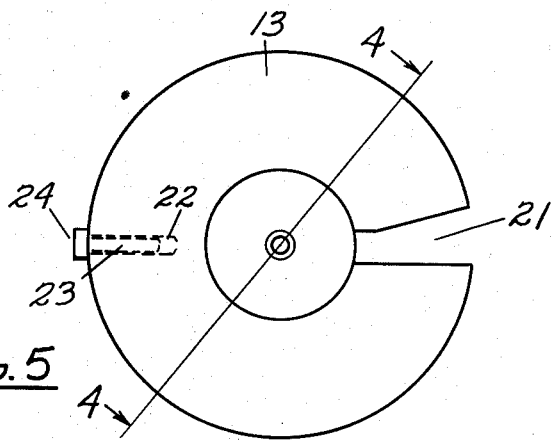
Figure 7:
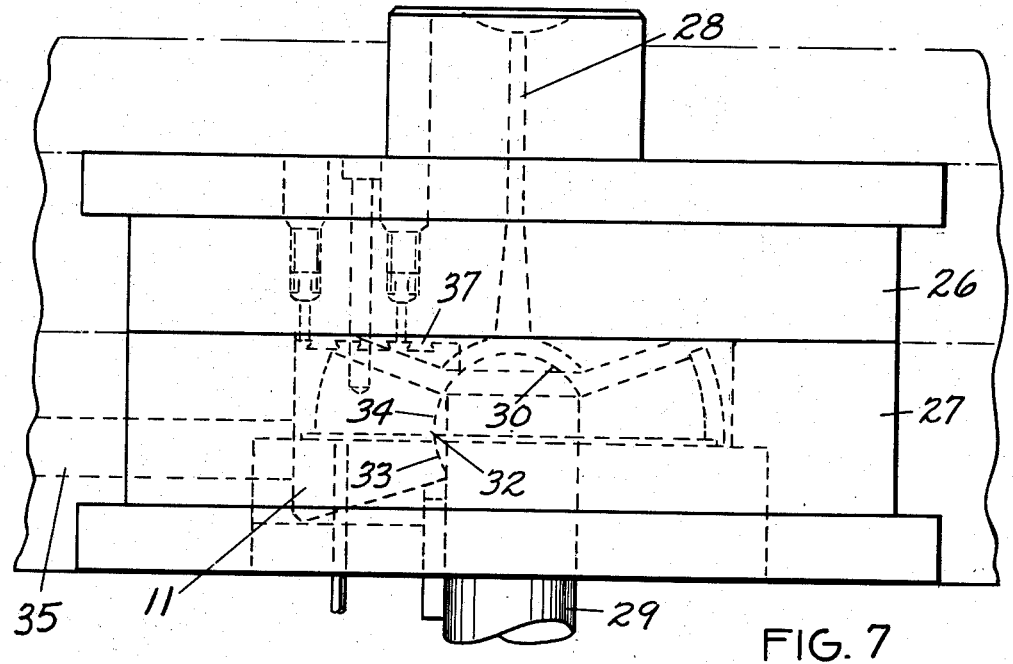
Figure 8:
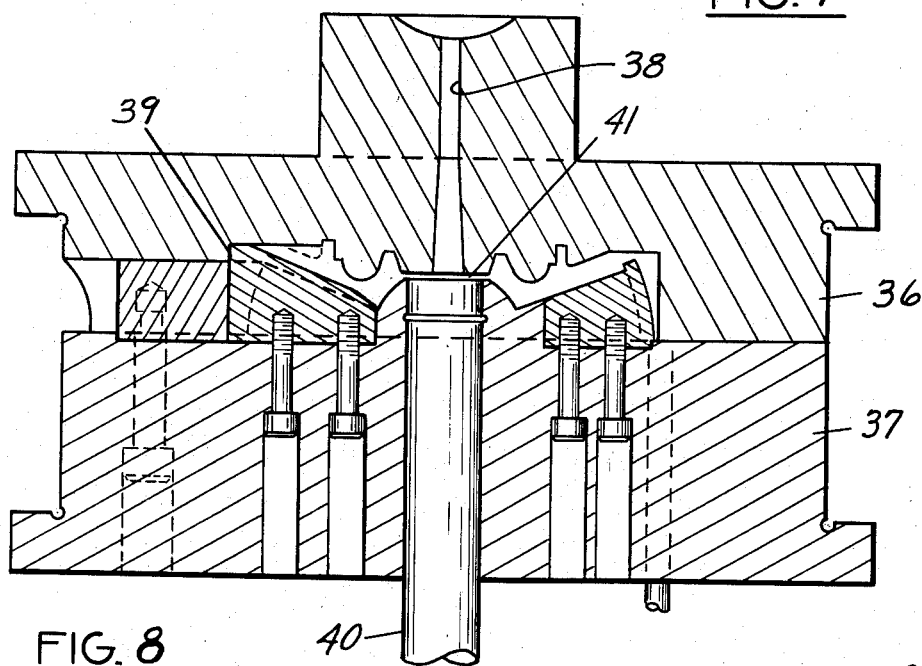

In the drawings, FIG. 1 is a section through a water meter partly broken away to show the measuring chamber, FIG. 2 is a section through the lower half of the measuring chamber, FIG. 2a is a fragmentary edge view of the lower half of the measuring chamber, FIG. 3 is a sectional view through the upper half of the measuring chamber, FIG. 4 is a section through the piston taken on line 4—4 of FIG. 5, FIG. 5 is a top plan view of the piston, FIG. 6 is a section through the mold for molding the piston, FIG. 7 is a section through the mold for molding the bottom or lower half of the measuring chamber, and FIG. 8 is a section through the mold for molding the top or upper half of the measuring chamber.

The conventional parts of the meter are readily identified, 1 indicates the main casing or meter body, 2 the register box, 3 the incoming water line, 4 the outgoing water line, 5 the strainer, 6 the sand ring, 7 the coupling for driving the meter register, and 8 the bottom cap fastened to the lower end of the meter body by bolts 9. The parts so far described are or may be of common construction.

The water flowing into the inlet fitting 3 can reach the outlet fitting 4 only by passing through a measuring chamber which consists of three parts, a bottom casing 10 carrying a diaphragm or partition 11; a top casing 12; and a nutating disc piston 13. When these parts are assembled, there is provided a closed chamber for the piston with the inlet 11a and outlet 11b of the chamber separated by the diaphragm or partition 11. The diaphragm also projects outside the measuring chamber and is received in liquid tight engagement in a groove 14 in the body 1. A gasket 15 provides a liquid tight seal at the lower end of the partition 14. The incoming water flows around the outside of the measuring chamber but can only reach the outlet 4 by flowing through the measuring chamber and causing liquid displacement nutation of the disc piston 13 and resultant turning of the coupling 7 driving the register.

Heretofore the top and bottom parts of the measuring chamber have been made of bronze and the disc piston has been built up out of a hard rubber disc clamped between two hemispherical hard rubber balls by a bolt which also serves as the spindle for connecting the disc piston with the register coupling 7. Hard rubber has been used for the disc piston because its specific gravity is very nearly that of liquid displaced. It has not been dimensionally stable under operating conditions particularly if the water temperatures is above 90° F. The bronze parts being made out of metal require expensive machining operations and have been subject to corrosion. According to the present invention, corrosion is completely eliminated by making the measuring chamber of the meter out of one of the inert non-toxic thermoplastics having low water absorption such as those sold under the trade marks "Delrin," "Penton" and related non-toxic plastics. These plastics in addition to being dimensionally stable are not subject to corrosion. These plastics also have a low coefficient of friction when running against each other.

The accuracy of the meter is improved by injection molding the plastic in such a manner as to eliminate or minimize strains which would cause distortion of the molded parts and further to eliminate machining. Machining of plastics is not only expensive, but it causes changes in dimensions due to relief of strains as the fibers of the plastic are cut. For example, the disc piston 13 is made in a single piece with a spherical ball 16 at the center from which projects a shaft or stem 17. In the mold for making the disc piston (FIG. 6) which comprises upper and lower parts 18 and 19, the injection sprue 20 is used to form the stem 17. This sprue being at the center of the piece produces the uniform filling of the mold cavity desirable to prevent distortion causing strains in the molded plastic. After withdrawing from the mold, it is only necessary to cut off the upper end of the sprue in order to have the complete disc piston with the integral stem 17. The slot 21 which fits over the diaphragm 11 is integrally molded in the piston. In order to reduce frictional thrust of large initial liquid volumes, a hole 22 may be drilled in the edge of the piston opposite the slot 21 to receive the stem 23 of a roller 24 which glides up and down in slot 25 in the measuring chamber.

The bottom casing part 10 is molded in a mold (FIG. 7) having upper and lower mold parts 26 and 27. The bottom casing is molded in inverted position with the injection sprue 28 being in the upper mold part 26 and at the center of the mold cavity. In the lower mold part is a reciprocable piston 29 having a spherical upper end 30 which is to form the lower seat 31 for the ball 16 of the piston. The diameter of the piston 29 is slightly less than the diameter of the spherical surface 30 which accordingly is less than a hemisphere. On one side of the piston 29 is an insert 32 having its outer surface 33 projecting radially outside the piston and in substantially direct continuation of the spherical end surface 30 of the piston 29. The insert 32 is part of the piston 29 and engages the inner surface 34 of the diaphragm or partition 11. The inner surface 34 of the diaphragm as viewed in FIG. 7 extends below the center of the spherical surface 30 so the surface 34 lies on an arc projecting outside the piston 29. From one aspect the surface 34 is an under cut. The diaphragm or partition 11 is received in a groove in the lower mold part 27 but in order to load the partition into the mold it is necessary to first elevate the piston 29 out of the lower mold part 27 and to place the surface 34 of the partition against the surface 33 on the piston. Then as the piston is lowered to the position shown, the partition is drawn down into the lower mold part and precision located with reference to the bearing surface 30. A laterally moving plunger 35 holds the partition 11 tight against the surface 34 during the molding operation. At the upper edge of the partition 11 are dovetail projections 37 which during the molding operation are imbedded in a radial rib 38 on the bottom side of the measuring chamber part 10. By this construction, the partition or diaphragm 11 is precision located in the lower measuring chamber part 10. In order to remove the lower measuring chamber part from the mold it is first necessary to separate the upper and lower mold parts 26 and 27 and then to elevate the piston 29 above the lower mold part 27. This carries the molded piece outside of the cavity in the lower mold part after which the molded piece can be tilted or turned so as to move the spherical surface 34 on the partition 11 clear of the mating surface 33 on the piston 29. This is necessary because the spherical surfaces 33 and 34 provide an under cut which prevents direct or straight line ejection of the molded part from the lower mold cavity. When the piston 29 is elevated above the lower mold part 27 to remove the molded piece, it is in a position for loading a partition 11 for a succeeding molding operation. When the lower casing part 10 is removed from the mold cavity, it is ready for use after the sprue has been cut off. There are no other finishing operations required.

The top casing 12 is molded in a mold consisting of upper and lower mold parts 36 and 37. The top casing 12 is molded in an upright position with the plastic being injected through a sprue 38. As in the previous parts, the sprue 38 is at the center of the mold cavity and accordingly distortion causing shrinkage of the molded part is minimized. The lower mold part 37 carries a metal plate 39 of the same dimension as the metal diaphragm 11. The purpose of the metal plate 39 is to mold in the top casing a groove 39a which will tightly receive the diaphragm 11 as the upper and lower casing parts are pressed together. It will be noted that there is a slight space between the upper end of the knock-out pin 40 and the lower end of the sprue 38 so that at the end of the molding operation there is a thin flash 41 which is broken off when the sprue is removed. This is the only finishing operation required.

The assembly of measuring chamber is xery simple. The piston 13 is first assembled in the bottom or lower casing part 10 with the slot 21 in the piston straddling the partition 11 and with the roller 24 fitting in the groove 25. This assembly is easy because the piston can be tilted so that the ball 16 will readily slide under the surface 34 on the diaphragm 11. The stem 17 is then moved to an upright position in which the surface 34 on the partition overlies the upper part of the ball 16. The top or upper casing part is then pressed onto the bottom casing. The stem 17 projects out through the central hole 42 in the upper casing part. The upper edge of the diaphragm 11 is tightly received in the groove 39a in the top casing. The rabbet joints 44 and 45 at the periphery of the axially extending side walls of the top and bottom casing parts snap together in liquid tight engagement. This completes the assembly of the measuring chamber for the water meter. When so assembled, the outer edge of the diaphragm 11 projects outside the measuring casing in position to be received in the groove 14 in the body 1 of the meter. This precisely locates the measuring chamber in the body of the meter in proper position so that it is correctly aligned with the outlet 4.

What is claimed as new is:

1. A water meter measuring chamber part, said part being a single piece, injection molded, of one of the inert non-toxic thermoplastics of low water absorption, the part having a bottom wall with an upwardly facing spherical seat on its upper side and further having a radial rib on the lower side of the bottom wall with a one piece radial metal diaphragm having its lower portion cast into said rib during the injection molding operation and its upper portion with an under cut inner edge surface in direct continuation of the spherical seat.

2. A water meter measuring chamber comprising a top part and a bottom part, said parts each comprising a single piece injection molded on one of the inert non-toxic thermoplastics having low water absorption with side walls extending toward each other and mating together to provide a hollow chamber, and portions of the side walls complementing each other to provide a passageway, a nutating disc piston within the chamber, the top part having a top wall with a central opening therein surrounded by a downwardly facing spherical seat on the underside of the top wall, the bottom part having a bottom wall with an upwardly facing spherical seat on its upper side and further having a radial rib on the underside of the bottom wall with a one piece radial metal diaphragm having its lower end portion provided with interlocking projections embedded and molded into said rib during the injection molding operation and having its upper portion bridging the space between the top and bottom parts and dividing the passageway into an inlet on one side of the diaphragm and an outlet on the other side of the diaphragm and with an under cut inner edge surface of the diaphragm in direct continuation of the spherical seats on the top and bottom parts, said spherical seats and the surrounding surfaces of the top and bottom parts being in an as molded condition whereby distortion caused by cutting of the fibers of the plastic by machining is eliminated, and the disc piston having a stem extending out through said central opening, a ball at the center of the piston bearing on said spherical seats, and a slot in the disc with edges straddling the diaphragm, the disc piston, ball and stem being a single piece of injection molded plastic of one of the inert non-toxic thermoplastics of low water absorption with the injection sprue comprising the stem.

3. A water meter measuring chamber comprising a top part and a bottom part, said parts having side walls extending axially toward each other and mating together to provide a hollow chamber, and portions of the side walls complementing each other to provide a passageway, said top and said bottom part each being a single piece injection molded of one of the inert non-toxic thermoplastics of low water absorption, and a nutating disc piston, the bottom part having a bottom wall with an upwardly facing spherical seat on its upper side and further having a radial metal diaphragm having its lower edge provided with interlocking projections embedded and molded into the bottom and side wall of the bottom part and with its upper portion bridging the space between the top and bottom parts and dividing the passageway into an inlet on one side of the diaphragm and an outlet on the other side of the diaphragm, the inner edge of the diaphragm having an under cut surface in direct continuation of the spherical seats on the top and bottom parts, the outer edge of the diaphragm projecting radially outside the top and bottom parts, the top part having a central opening in its top wall surrounded by a downwardly facing spherical seat on the underside of the top wall and further having a radial groove seating the upper edge of the diaphragm, and the disc piston having a stem extending out through said central opening, a ball at the center of the piston bearing on said spherical seats, said spherical seats and the surrounding surfaces of the top and bottom parts being in an as molded condition whereby distortion caused by cutting of the fibers of the plastic by machining is eliminated, and a slot in the disc with edges straddling the diaphragm, the disc piston, ball and stem being a single piece of injection molded plastic of one of the inert non-toxic thermoplastics of low water absorption with the injection sprue comprising the stem.

4. A water meter measuring chamber comprising a top part and a bottom part, said parts having side walls extending axially toward each other and mating together to provide a hollow chamber, and portions of the side walls complementing each other to provide a passageway, said top and said bottom part each being a single piece injection molded of one of the inert non-toxic thermoplastics of low water absorption, and a nutating disc piston, the bottom part having a bottom wall with an upwardly facing spherical seat on its upper side and further having a radial metal diaphragm having its lower edge provided with interlocking projections embedded and molded into the bottom and side wall of the bottom part and with its upper portion bridging the space between the top and bottom parts and dividing the passageway into an inlet on one side of the diaphragm and an outlet on the other side of the diaphragm, the inner edge of the diaphragm having an under cut arcuate surface on a center below the top of the diaphragm and coincident with the center of the spherical surface in the bottom part, the outer edge of the diaphragm projecting radially outside the top and bottom parts, the top part having a central opening in its top wall surrounded by a downwardly facing spherical seat on the underside of the top wall and further having a radial groove seating the upper edge of the diaphragm, the center of the spherical surface on the upper part being coincident with the center of the spherical surface in the bottom part, said arcuate surface being in direct continuation of said spherical surfaces, and the disc piston having a stem extending out through said central opening, a ball at the center of the piston bearing on said spheral seats, said spherical seats and the surface rounding surfaces of the top and bottom parts being in an as molded condition whereby distortion caused by cutting of the fibers of the plastic by machining is eliminated, and a slot in the disc with edges straddling the diaphragm, the disc piston, ball and stem being a single piece of injection molded plastic of one of the inert non-toxic thermoplastics of low water absorption with the injection sprue comprising the stem.

5. A water meter measuring chamber part having a bottom wall with an upwardly facing spherical seat on its upper side, an upwardly extending peripheral wall, said walls and seat being a single piece injection molded of one of the inert non-toxic thermoplastics having low water absorption, and a radial metal diaphragm having its lower portion provided with interlocking projections embedded and molded into said part and its upper portion projecting above said part, said diaphragm having an under cut arcuate inner edge surface in direct continuation of said spherical seat and on a center below the upper portion of the diaphragm, and said spherical seat and the surrounding surfaces on the bottom and side walls being in an as molded condition whereby distortion caused by cutting of the fibers of the plastic by machining its eliminated.

6. In a water meter having a measuring chamber comprising top and bottom parts with an upwardly facing spherical seat on the bottom part and central opening surrounded by a downwardly facing spherical seat on the top part, a nutating disc piston and stem consisting of a single piece of injection molded plastic of one of the inert non-toxic thermoplastics of low water absorption with the injection sprue comprising the stem adapted to extend out through said opening and with a ball at the lower end of the stem adapted to bear on said spherical seats and with the ball and disc surfaces in an as molded condition whereby distortion caused by cutting of the fibers of the plastic by machining is eliminated.

References Cited in the file of this patent

UNITED STATES PATENTS

| | | |
|---|---|---|
| 379,805 | Nash | Mar. 20, 1888 |
| 384,024 | Davies | June 5, 1888 |
| 588,646 | Lambert | Aug. 24, 1897 |
| 702,241 | Northrop | June 10, 1902 |
| 851,860 | Brice | Apr. 30, 1907 |
| 1,280,689 | Eck et al. | Oct. 8, 1918 |
| 1,492,906 | Thomson | May 6, 1924 |
| 1,660,446 | Heltzen | Feb. 28, 1928 |
| 1,857,851 | Marden | May 10, 1932 |
| 1,871,912 | Patch | Aug. 16, 1932 |
| 1,942,874 | Nash | Jan. 9, 1934 |
| 2,244,539 | Krueger | June 3, 1941 |
| 2,296,491 | Baker et al. | Sept. 22, 1942 |
| 2,415,395 | Ulrich | Feb. 4, 1947 |
| 2,465,799 | Gravesen | Mar. 29, 1949 |
| 2,658,238 | Rizzo | Nov. 10, 1953 |
| 2,724,862 | Merrill et al. | Nov. 29, 1955 |

FOREIGN PATENTS

| | | |
|---|---|---|
| 943 | Great Britain | 1888 |
| 997,334 | France | Sept. 12, 1951 |